US011600165B2

(12) United States Patent
Silverstein et al.

(10) Patent No.: US 11,600,165 B2
(45) Date of Patent: Mar. 7, 2023

(54) NOTIFICATION REMINDER SYSTEM

(71) Applicant: International Business Machines Corporation, Armonk, NY (US)

(72) Inventors: Zachary A. Silverstein, Austin, TX (US); Neerju Neerju, Chelmsford, MA (US); Angel Marie Smith, Rancho Cordova, CA (US); Michael Seth Silverstein, Jacksonville, FL (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 17/210,572

(22) Filed: Mar. 24, 2021

(65) Prior Publication Data
US 2022/0309901 A1    Sep. 29, 2022

(51) Int. Cl.
*G08B 21/24* (2006.01)
*G08B 21/18* (2006.01)

(52) U.S. Cl.
CPC .......... *G08B 21/24* (2013.01); *G08B 21/182* (2013.01)

(58) Field of Classification Search
CPC ...... G08B 21/24; G08B 21/182; H04L 51/224
See application file for complete search history.

(56) References Cited

U.S. PATENT DOCUMENTS

| | | |
|---|---|---|
| 7,895,277 B2 | 2/2011 | Drory |
| 8,352,561 B1 * | 1/2013 | Denise .................. H04L 51/04 709/224 |
| 8,766,793 B2 | 7/2014 | Elumalai |
| 9,275,376 B2 | 3/2016 | Barraclough |
| 10,614,420 B2 | 4/2020 | Radhakrishnan |
| 2018/0097753 A1 | 4/2018 | Gill |
| 2018/0218325 A1 | 8/2018 | Radhakrishnan |
| 2019/0182196 A1 | 6/2019 | Avital |
| 2020/0053040 A1 | 2/2020 | Devasthali |

(Continued)

FOREIGN PATENT DOCUMENTS

CA           2578632 C    6/2014

OTHER PUBLICATIONS

"Automatic Management of Multiple Contexts", An IP.com Prior Art Database Technical Disclosure, Authors et al.: Disclosed Anonymously, IP.com No. IPCOM000252682D, IP.com Electronic Publication Date: Feb. 1, 2018, 11 pages.

(Continued)

*Primary Examiner* — Brian Wilson
(74) *Attorney, Agent, or Firm* — Erika R. DeCosty

(57) ABSTRACT

A computer-implemented method for re-notifying a user about a previous notification is disclosed. The computer-implemented method includes determining a baseline notification rate of the user. The computer-implemented method further includes determining whether the user's current notification rate exceeds a predetermined threshold with respect to the baseline notification rate. The computer-implemented method further includes determining, in response to the user's current notification rate exceeding the predetermined threshold, whether renotification of a notification is required. The computer-implemented method further includes re-notifying, in response to determining that renotification of the notification is required, the user about the notification.

20 Claims, 3 Drawing Sheets

(56) References Cited

U.S. PATENT DOCUMENTS

2020/0211035 A1* 7/2020 Bluming ............ G06Q 10/0635

OTHER PUBLICATIONS

"Method and System for Providing a Predictive Personalized Reminder Service based on User Cognitive State and Context", An IP.com Prior Art Database Technical Disclosure, Authors et al.: Disclosed Anonymously, IP.com No. IPCOM000254566D, IP.com Electronic Publication Date: Jul. 12, 2018, 5 pages.
IBM, "Workplace Collaboration Services", downloaded from the Internet on Jan. 26, 2021, <https://www.IBM.com/services/digital-workplace/workplace-collaboration?>, 7 pages.

* cited by examiner

NOTIFICATION REMINDER SYSTEM

BACKGROUND

The present invention relates generally to the field of reminding a user of previous notifications, and more particularly to reminding a user of previous opened notifications that require further action.

Different messaging platforms make it easy for users to communicate instantly. Many users have and use multiple different devices throughout the day or at once. Typically, users have user accounts on multiple different platforms or applications. Sometimes, users even have separate accounts on the same platform or application for personal and work obligations. Notifications on different platforms and devices can vary and the same notification may even be sent to multiple devices or platforms for the same user. Depending on the user, the number of notification and the rate at which notification are received can greatly vary.

SUMMARY

According to one embodiment of the present invention, a computer-implemented method for re-notifying a user about a previous notification is disclosed. The computer-implemented method includes determining a baseline notification rate of the user. The computer-implemented method further includes determining whether the user's current notification rate exceeds a predetermined threshold with respect to the baseline notification rate. The computer-implemented method further includes determining, in response to the user's current notification rate exceeding the predetermined threshold, whether renotification of a notification is required. The computer-implemented method further includes re-notifying, in response to determining that renotification of the notification is required, the user about the notification.

According to another embodiment of the present invention, a computer program product for re-notifying a user about a previous notification is disclosed. The computer program product includes one or more computer readable storage media and program instructions stored on the one or more computer readable storage media. The program instructions include instructions to determine a baseline notification rate of the user. The program instructions further include instructions to determine whether the user's current notification rate exceeds a predetermined threshold with respect to the baseline notification rate. The program instructions further include instructions to determine, in response to the user's current notification rate exceeding the predetermined threshold, whether renotification of a notification is required. The program instructions further include instructions to re-notify, in response to determining that renotification of the notification is required, the user about the notification.

According to another embodiment of the present invention, a computer system for re-notifying a user about a previous notification is disclosed. The computer system includes one or more computer processors, one or more computer readable storage media, computer program instructions, the computer program instructions being stored on the one or more computer readable storage media for execution by the one or more computer processors. The program instructions include instructions to determine a baseline notification rate of the user. The program instructions further include instructions to determine whether the user's current notification rate exceeds a predetermined threshold with respect to the baseline notification rate. The program instructions further include instructions to determine, in response to the user's current notification rate exceeding the predetermined threshold, whether renotification of a notification is required. The program instructions further include instructions to re-notify, in response to determining that renotification of the notification is required, the user about the notification.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
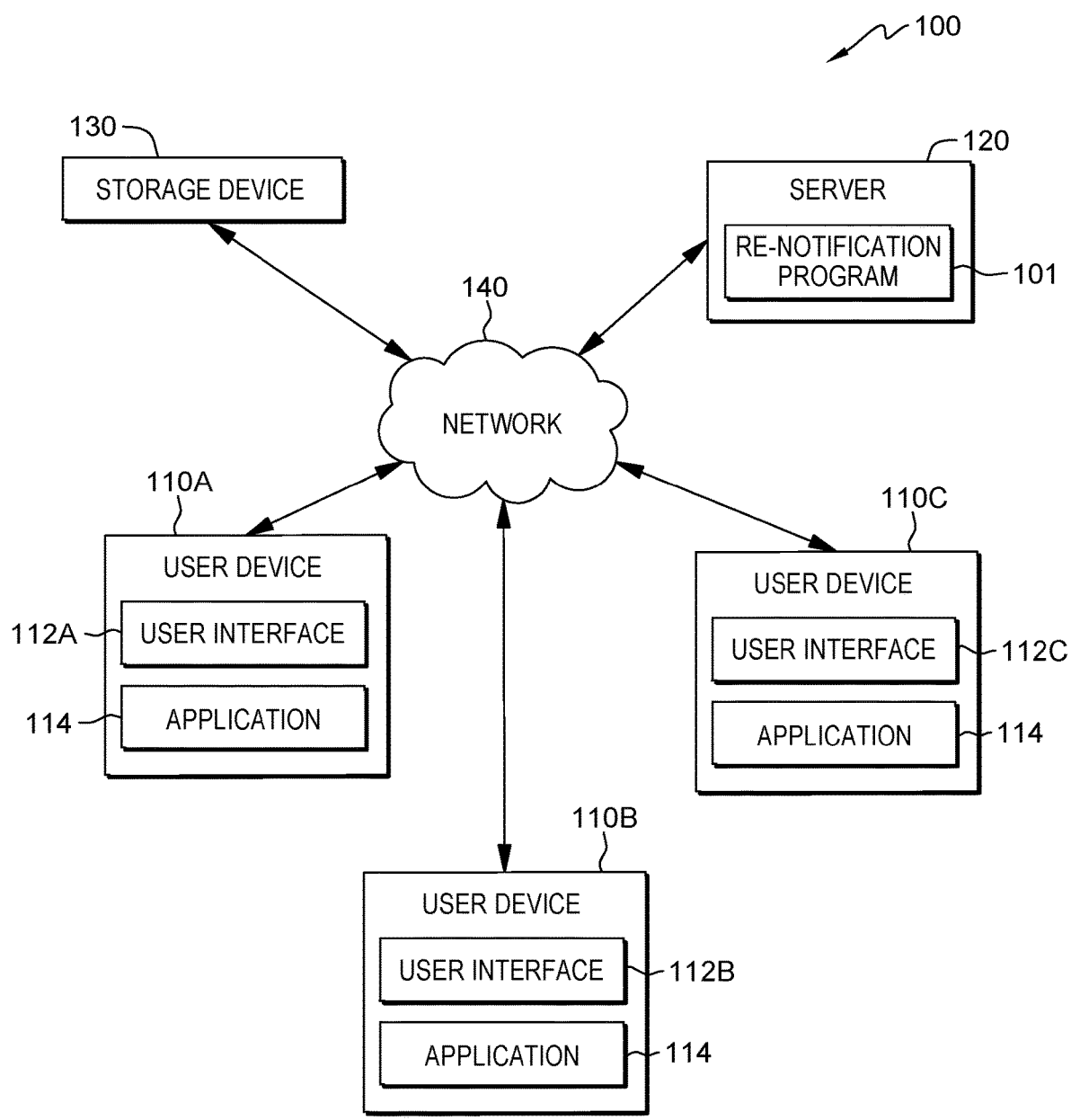
FIG. 1 is a block diagram of a system, generally depicted 100, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of reminding a user of previous notifications, and more particularly to reminding a user of previous opened notifications that require further action.

Different messaging platforms make it easy for users to communicate instantly. Users typically receive multiple notifications throughout the day. The average number of notifications each user receives throughout the day varies depending on the number of devices and applications of the user. Many messages received from messaging or email platforms prompt the user to perform additional measures, such as answering a message or performing an additional task (e.g., uploading a document, messaging another person, and accepting a calendar invitation). When a user receives a notification, the user may or may not open the message corresponding to the notification at the time the notification is received. Typically, when the user opens a notification, they have the intention of answering the message corresponding to the notification. However, if a user opens a notification and does not answer, they will not receive another notification reminding them of the previous notification that went unanswered. Similarly, if the user does not open the notification when it is first received, the user may forget to open the notification at a later time. As new notifications and messages are received, the previous unanswered message may get pushed further out of the user's radar.

Oftentimes, a user receives one or more notifications while they are busy. If a user is busy, such as in a meeting, on the phone, or occupied with another task, it is easy for the user to forget to respond or take action on the notification they opened. When this happens, the user may forget to come back to the notification or what the notification even pertained to, and ultimately let the message corresponding to the notification go unanswered. Sometimes, a user receives multiple notifications in a short amount of time. The same user may receive a different number of notifications at different points in their day. For example, a user may receive 20 notifications between 10:00-11:00 am whereas the same user may receive five notifications between 12:00-1:00 pm. As the number and/or rate of notifications received within a particular time period increases, so too does the likelihood that a notification goes unanswered. Similarly, as the number and/or rate of notifications received within a particular time period increases, so too does the likelihood that a user opens a message with the intention of responding to the message at a later time but fails to ultimately do so.

For example, a user can open one notification with the intention of answering, and then receives a second notification which causes them to forget to answer the first notification. The more notifications a user receives while busy or in a short period of time, the less likely the user is to respond or take action to one or more of the notifications. Embodiments of the present invention recognize that when a user opens a notification the user intends to answer the notification. Embodiments of the present invention further recognizes that if a user opens a notification and does not answer, the user intended to but forgot to answer the notification.

Embodiments of the present invention improve upon the foregoing deficiencies of forgetting to respond to notifications by re-notifying a user of a notification they did not respond to during a busy time. In some embodiments, a user is re-notified of notifications that the user did not open or otherwise respond to. In other embodiments, a user is re-notified of notifications that the user did open or otherwise respond to, but require further action by the user.

Embodiments of the present invention recognize that the average rate of notifications is different by user, day of the week, and time of day. Embodiments of the present invention monitor the individual user's rate of notifications to determine the individual user's average rate of notifications. Embodiments of the present invention monitor the individual user's rate of notifications to determine if the current notification rate is outside of a predetermined threshold based on the individual user's average rate of notifications. Embodiments of the present invention further monitor the actions of a user to determine if the user is busy using other applications, is in a meeting, or is working on a project while notifications are received. Typically, if a user is busy when the user receives a notification, the user is more likely forget to answer an opened notification because the user is preoccupied with another task. Embodiments of the present invention monitor if the user receives a notification while busy and determine if the user opens the message or notification. Typically, if a user opens a notification and is busy, they intend to answer or take action of the notification. Meaning, if the user opens the notification and does not answer because they are busy, they are likely to forget to answer the notification in the future since the notification is opened. Embodiments of the present invention recognize notifications or messages can be different lengths. Meaning, it would take the user more time to read a long message and a shorter amount of time to read a shorter message. Embodiments of the present invention monitor and compare the length of the text of the notification or message to the amount of time the user takes to read the notification or message. Typically, the more time the user spends reading the notification, the more the user will comprehend and remember to answer the notification. For example, the shorter amount of time the user spends reading the notification and the longer the notification is, the less likely the user fully read or understood the notification. In another example, if the notification received is a shorter message of only a few words and the user only spent a few seconds reading the notification, there may be no need for to re-notify the user of the notification. Embodiments of the present invention re-notify the user of a notification they did not respond to while busy.

Embodiments of the present invention recognize that different message have different urgency levels. For example, a first message stating "Call me now" compared to a second message stating "Call me this weekend" have different required response times. In this example, it should be understood that the first message has a higher urgency level than the second message. Embodiments of the present invention can detect the urgency of a message based on the context, timing, and frequency of message notifications. Embodiments of the present invention renotify a user of a message they did not respond to base on the urgency of the message or notification.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a network computing environment, generally designated 100, for re-notifying a user of a notification in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Computing system 100 includes user devices 110A, 110B, and 110C, server 120, and storage device 130 interconnected over network 140. Each of user devices 110A, 110B, and 110C may represent a computing device of a user, such as a laptop computer, a tablet computer, a netbook computer, a personal computer, a desktop computer, a personal digital assistant (PDA), a smart phone, a wearable devices (e.g., smart glasses, smart watches, e-textiles, AR headsets, etc.), or any programmable computer systems known in the art. For example, user device 110A may be a smartphone, user device 110B may be a laptop computer, and user device 110C a tablet. In general, each of user devices 110A, 110B, and 110C can represent any programmable electronic device or combination of programmable electronic devices capable of executing machine readable program instructions and communicating with server 120, storage device 130 and other devices (not depicted) via a network, such as network 140. User devices 110A, 110B, and 110C may include components, as depicted and described in further detail with respect to FIG. 3, in accordance with embodiments of the present invention.

User devices 110A, 110B, and 110C further include user interface 112A, user interface 112B, user interface 112C, respectively, and application 114. A user interface is a program that provides an interface between a user of an end user device, such as user devices 110A-C, and a plurality of applications that reside on the device (e.g., application 114). A user interface, such as user interfaces 112A-C, refers to the information (such as graphic, text, and sound) that a program presents to a user, and the control sequences the user employs to control the program. A variety of types of user interfaces exist. In one embodiment, user interfaces 112A-C are graphical user interfaces. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interfaces 112A-C are scripts or application programming interfaces (APIs). In an embodiment, user interfaces 112A-C display notifications and re-notification messages to the user via one or more of user devices 110A-C.

Application 114 can be representative of one or more applications (e.g., an application suite) that operate on user devices 110A-C. In various example embodiments, application 114 can be an application that a user of user device 110A, 110B, or 110C utilizes to receive notifications via a user interface, such as user interfaces 112A-C. In other embodiments, application 114 can be another mobile device application (e.g., a web browser, enterprise-specific messaging application, social media application, etc.). For example, application 114 is a client-side application associated with server 120 (e.g., a client-side application associated with re-notification program 101).

In an additional embodiment, application 114 can operate to perform the processing steps of re-notification program 101 (i.e., application 114 can be representative of re-notification program 101 operating on user device 110A, 110B, and 110C), in accordance with various embodiments of the present invention. For example, a user of user device 110A can receive and open a notification on application 114 (e.g., via user interface 112A). In an embodiment, application 114 monitors users' notifications to determine a baseline notification. In an embodiment, the baseline notification is the rate of notifications the user receives in a predetermined amount of time. In an embodiment, the baseline notification is the average number of notifications the user receives across all user devices 110A, 110B, and 110C within a predetermined period of time. In an embodiment, the baseline notification is the average number of notifications the user receives on one or more user devices within a predetermined amount of time. In some embodiments, a pop-up window is generated via application 114 and displayed to a user via a user interface, such as user interface 112A, B, or C, re-notifying a user of an unanswered opened notification when notifications exceed the baseline notification or predetermined threshold. In an embodiment, a user is re-notified of one or more notifications received during the predetermined time period once the baseline notification or predetermined threshold is reached. In other words, the user may be re-notified of messages received prior to and/or after the threshold is reached. In another embodiment, a user is only re-notified of the notifications received after the threshold is reached.

In example embodiments, server 120 can be a desktop computer, a computer server, or any other computer systems, known in the art. In certain embodiments, server 120 represents computer systems utilizing clustered computers and components (e.g., database server computers, application server computers, social media server computers etc.) that act as a single pool of seamless resources when accessed by components of computing environment 100 (e.g., user devices 110A-C, storage system 130, and other devices not shown). In general, server 120 is representative of any electronic device or combination of electronic devices capable of executing computer readable program instructions. Server 120 may include components as depicted and described in further detail with respect to FIG. 3, in accordance with embodiments of the present invention.

Storage device 130 can be implemented with any type of storage device which is capable of storing data that may be accessed and utilized by server 120 and user device 110A, 110B, 110C. In an embodiment, storage device 130 can represent multiple storage devices and collections of data within server 120. Re-notification program 101 utilizes storage device 130 to store and retrieve various information, including the user's average notification rate.

For example, re-notification program 101 stores information including the notifications received by user device 110A, 110B, or 110C and their respective timestamp. In an embodiment, re-notification program 101 stores information related to which notifications are opened or answered and which notification remain unopened or unanswered. For example, re-notification program 101 may determine that a user receives and opens the following notification: "Please send me the document by tonight," and that the user replies "Sure" to the notification. In this example, re-notification program 101 may determine that the user answered the notification, but if the user does not send the document tonight, re-notification program 101 may determine that the user was unresponsive to the notification. Accordingly, re-notification may store information associated with the unresponsive notification in storage device 130. In an embodiment, re-notification program 101 stores various information related to a message associated with a notification, such as where, when, and who the notification was received from. In an embodiment, re-notification program 101 stores information associated with the amount of time the user spent reading a message or otherwise had the message "open" on their device.

In example embodiments, re-notification program 101 re-notifies a user of a notification they opened and forgot to respond to. In an embodiment, re-notification program 101 determines the user's baseline notification rate. In an embodiment, re-notification program 101 determines if the user's current notification rate falls outside of a predetermined threshold. In an embodiment, re-notification program 101 determines if the user opened a notification. In an embodiment, re-notification program 101 determines if re-notification of a message is necessary. In an embodiment, re-notification of a message is necessary if the user opens a message corresponding to a notification that requires a response or subsequent action, but the user did not respond to the message or perform the required action. In an embodiment, re-notification of a message is necessary if the user opens a message corresponding to a notification if the user responded to the message, but failed to adequately respond to the message.

In an embodiment, re-notification program 101 determines the user's baseline notification rate. In an embodiment, the user's baseline notification rate is the average amount of notifications a user receives in a given amount of time. For example, if a user receives 12 notifications in 60 minutes, the users baseline notification rate is 12 notifications per hour or 1 notification every 5 minutes. In an embodiment, re-notification program 101 determines a user's baseline notification rate by tracking the number of notifications a user receives on all of their devices. For example, re-notification program 101 determines a user receives an average of 4 notifications in 10 minutes across all user devices and determines the baseline notification rate is 4 notifications in 10 minutes across all user devices. In another example, re-notification program 101 determines a user receives an average of 3 notifications in 10 minutes on their work computer and determines the baseline notification rate is 3 notifications in 10 minutes on the users work computer. In an embodiment, re-notification program 101 determines multiple baseline notification rates for a user based on a particular time of the day or particular day of the week. For example, a user may have a higher average notification rate on Tuesday mornings than on a Friday afternoon. In an embodiment, re-notification program 101 determines multiple baseline notification rates for respective devices and/or of the user. For example, the user's baseline notification rate may higher on the user's work laptop than their personal laptop. In an embodiment, the user's baseline notification rate can vary based on the application or platform the notification is coming from. For example, the user's baseline notification rate may be higher for personal text messages than personal emails. In an embodiment, re-notification program 101 determines a single baseline notification rate that encompasses notifications received from all of the users applications and devices. For example, the user's baseline notification rate can include any and all notifications received by any and all user devices.

In an embodiment, re-notification program 101 utilizes endpoint monitoring to determine a user's baseline notification rate. Endpoint monitoring monitors or tracks the activity on user devices, such as user devices 110A, 110B, and 110C. Endpoint monitoring monitors the various notifications received from user devices 110A, 110B, and 110C. In an embodiment, endpoint monitoring determines notification activity for each platform, each device, and each operating system.

In an embodiment, re-notification program 101 determines a threshold based on the baseline notification rate. In an embodiment, re-notification program 101 determines the threshold to be one standard deviation greater than the baseline notification rate. For example, if re-notification program 101 determines the baseline notification rate to be 5 notifications every 15 minutes with a standard deviation of 2 notifications, a threshold one standard deviation from the baseline notification is 7 notifications in 15 minutes. In an embodiment, user can select the threshold based on user preference. For example, a user may select their baseline preference to be 5 notifications within a 15 minute period. In an embodiment, the threshold is the same as the baseline notification rate. For example, if the baseline notification rate is 5 notifications in 30 minutes, the threshold notification rate will also be 5 notifications within a 30 minute time period.

In an embodiment, re-notification program 101 determines if the user's current notification rate is above a predetermined threshold. For example, if re-notification program 101 determines the predetermined threshold is 3 emails in 5 minutes while a user is in an online meeting, the user's current notification rate is above the predetermined threshold if the user receives more than 3 emails in 5 minutes while in an online meeting. In another example, if re-notification program 101 determines the predetermined threshold is 5 total notifications in 5 minutes across all of the users devices, the user's current notification rate is above the predetermined threshold if the user receives more than 5 total notifications in 5 minutes across all of the users devices. In another example, if re-notification program 101 determines the predetermined threshold is 5 total notifications in 10 minutes on the users work device, the user's current notification rate is above the predetermined threshold if the user receives more than 5 total notifications in 10 minutes on the users work device.

In an embodiment, re-notification program 101 determines the user's current activity. In an embodiment, re-notification program 101 determines the number of activities the user is performing concurrently, the interaction level of the user with respect to the user's devices and activities, and the number of opened notifications. In an embodiment, re-notification program 101 determines the number of activities the user is doing concurrently. An activity can include a meeting, typing, or any active use of one of the users user devices such as watching a video or reading. For example, if re-notification program 101 determines the user is in an online meeting and is typing in a document, re-notification program 101 determines the user is doing two activities. Typically, the more activities the user is performing, the busier the user is, and the less likely the user is to answer a message or adequately respond to a message. Typically, the more invested the user is in another activity, the less likely the user is to remember to reply to a notification the user opened. In an embodiment, re-notification program 101 determines the interaction level of the user per device or per activity. In an embodiment, re-notification program 101 classifies activities into interaction levels such as low, medium, and high interaction levels. For example, low interaction levels may include tasks that passively require the user's attention, such as listening to music, scrolling through social media, or not using the device. Medium interaction levels may include tasks requiring the user's interaction such as typing, reading, replying to another message, or having a meeting or call on mute. High interaction levels may include tasks requiring a large amount of the user's attention such as actively speaking during a meeting, being unmuted during a teleconference, being on a phone call or screen sharing.

In an embodiment, if re-notification program 101 determines if the user is sharing their screen, re-notification program 101 determines the interaction level of the user to be high or above a predetermined threshold. Typically, if a user is sharing their screen, the user is busy with another task. In an embodiment, if re-notification program 101 determines if the user is using their microphone, re-notification program 101 determines the interaction level of the user is high or above a predetermined threshold. In an embodiment, if re-notification program 101 determines the user is on a call or meeting but is muted, re-notification program 101 determines the interaction level of the user is medium or between a first and second predetermined threshold. In an embodiment, if re-notification program 101 determines the user is scrolling on a social media website, re-notification program 101 determines the interaction level of the user is low or below a predetermined threshold.

In an embodiment, re-notification program 101 monitors the active and open applications, users interaction with the applications, and mobile device management information. Mobile device management is the administration of mobile devices with management features for deployment of a combination of on-device applications and configurations, corporate policies and certificates, and backend infrastructure. In an embodiment, re-notification program 101 utilizes a watcher to monitor the users interaction with applications.

A watcher monitors and tracks activities on a device such as keyboard and mouse input. In an embodiment, re-notification program 101 determines the number of notifications at a system level. The use of a watcher is used only in instances when the user has agreed to the use of the watcher for purposes of re-notification program 101. For example, the use of a watcher for purposes of re-notification only is initiated after a user opts in to the use of a watcher.

In an embodiment, re-notification program 101 generates a score for each notification based on a variety of factors. In an embodiment, the score for each notification is incremented or decremented according to various characteristics and factors associated with the notification and the user. In an embodiment, re-notification program 101 decrements a score associated with a notification if the user responded to the notification. For example, if re-notification program 101 determines the user responded to a message corresponding to the notification, re-notification program 101 decreases the score. In another example, re-notification program 101 increments a score associated with a notification if the user opened, but did not respond to a message corresponding to the notification. In an embodiment, the manner in which re-notification program 101 increments or decrements the overall score of a notification is dependent on the sentiment of the notification. In an embodiment, re-notification program 101 determines the sentiment of a message corresponding to the notification. For example, re-notification program 101 determines the urgency of the notification based on the sentiment of the notification. In an embodiment, re-notification program 101 decrements the overall score associated with a notification if a level of urgency of a message corresponding to the notification is below a predetermined level. In an embodiment, renotification program 101 increments the overall score associated with a notification if a level of urgency of a message corresponding to the notification is above a predetermined level.

In an embodiment, re-notification program 101 increments or decrements the overall score based on a determination as to whether a user adequately responded to a message corresponding to a notification. For example, if the user receives a notification stating, "Please send the report by noon" and the user sends the report, re-notification program 101 determines the user adequately responded to the notification and will decrement the overall score associated with the notification. In another example, if the user receives and opens a notification stating, "Please call me as soon as possible" and the user does not call or respond to the notification within a predetermined time period, re-notification program 101 increments the overall score associated with the notification.

In an embodiment, the overall score for each notification is incremented or decremented based on the user's interaction or activity level at the time the notification is received. For example, if re-notification program 101 determines that the user's activity level is high or above a predetermined level of activity at the time the notification is received, re-notification program 101 increments the overall score associated with the notification. In another example, if re-notification program 101 determines that the user's activity level is low or below a predetermined threshold, re-notification program 101 decrements the overall score associated with the notification.

In an embodiment, re-notification program 101 determines if the user opened a notification. In an embodiment, re-notification program 101 increments an overall score associated with a notification based, at least in part, on comparing an amount of time the user viewed a message associated with the notification to a number of words included in the message and determining that a ratio of the amount of time the user viewed a message associated with the notification to the number of words included in the message is less than a predetermined threshold ratio. For example, if re-notification program 101 determines the user opened the notification for too short of a period of time (e.g., under a predetermined level of time) that it would have taken to read the entire notification, re-notification program 101 increments the score. As a specific example, if a user opens a message associated with a notification for five seconds and the message contains 150 words, re-notification program 101 determines that the ratio of time that the message was opened to the number of words is 1 second per 15 words. Accordingly, if the predetermined ratio threshold is 1 second per 10 words, re-notification program 101 would increment the score associated with the notification since a ratio of 1 second per 15 words is less than the threshold ratio of 1 second per 10 words.

In an embodiment, re-notification program 101 determines if re-notification is necessary. In an embodiment, re-notification is necessary if the user did not answer the notification. In an embodiment, re-notification is necessary if the user only partially answered the notification. For example, if a user receives a notification stating: "Please send me the document" and the user replies "Sure" and does not send the document either in the same reply or in a separate reply, the user has only partially answered the notification. In another example, if a user receives a notification stating: "Please call me in 10 minutes" and the user replies "Sure" and does not call the user in 10 minutes, the user has only partially answered the notification.

In an embodiment, re-notification program 101 determines if re-notification is necessary based on a score. In an embodiment, re-notification program 101 assigns a score to each notification based on the urgency of the notification. In an embodiment, re-notification program 101 determines the urgency score based on one or more of, but not limited to, the following factors: (i) content of notification, (ii) platform of notification, (iii) number of the users devices received notification, (iv) time lapse from notification, (v) amount of time spent reading notification, (vi) length of notification, (vii) proposed action in notification, (viii) if user started draft of response, (ix) amount of other recipients of notification, (x) who started notification chain, (xi) if user has previously responded to or engaged with any other notifications in notification chain, and (xii) if users name was used in notification message. In an embodiment, different factors contribute differently to the urgency score. Meaning, some factors weigh heavier than others. In an embodiment, the weight of a factor is predetermined or is a user preference.

In an embodiment, re-notification program 101 re-notifies a user of an unanswered notification based on the assigned score. In another example, re-notification program 101 re-notifies a user of an opened, but unanswered notification having a score assigned to a particular category. For example, if notification "A" was opened, unanswered, and the context of the notification indicated the need for the user to perform a task by a given time (e.g., a notification stating, "please send the report by noon."), re-notification program 101 assigns a high score. In this example, if the user also receives and opens notification "B" stating, "Hey, how are you?", re-notification program 101 assigns a low score since the notification does not require the user to perform a task by a given time. In this example, re-notification program 101 determines a baseline threshold of 3 notifications in 10 minutes. In this example, if the user receives 4 notifications in 10 minutes, meaning 1 notification over the baseline threshold, re-notification program 101 will renotify the user of notification "A" since notification "A" has a higher score than notification "B".

In an embodiment, re-notification program 101 only re-notifies users of notifications above a predetermined threshold score or notifications assigned to a particular scoring category. For example, if notification "A" was opened, unanswered, and the context of the notification indicated the need for the user to perform a task by a given time (e.g., a notification stating, "please send the report by noon."), re-notification program 101 assigns a high score. In this example, if the user also receives and opens notification "B" stating, "Hey, how are you?", re-notification program 101 assigns a low score since the notification does not require the user to perform a task by a given time. In this example, if the user also receives and opens notification "C" stating, "Hey, can you call me this afternoon?", re-notification program 101 assigns a medium score since the notification requires the user to perform a task by a given time. In this example, once the baseline threshold is met of 2 notifications in 5 minutes, re-notification program 101 re-notifies user of all notifications received with a medium or high score. In this example, re-notification program 101 will re-notify user of notification "A" and notification "C."

In an embodiment, re-notification program 101 re-notifies a user of all notifications and all scores once the predetermined number of the notification threshold is met. For example, if the predetermined threshold is 3 notifications in 10 minutes, once 3 notifications are received within 10 minutes, opened, and not responded to, re-notification program 101 re-notifies user of all notifications regardless of each notifications score.

In an embodiment, the assigned score is numerical. For example, the scores can be based on a scale of 1-10, with 10 being the highest. In this example, if notification "C" was opened, unanswered, and the context of the notification indicated the need for the user to perform a task urgently, such as a notification stating, "Call me now", re-notification program 101 assigns a high score of 10 to notification "C".

In an embodiment, re-notification program 101 assigns a score based on the application or device the notification is received from. For example, re-notification program 101 can assign a higher score for a notification received on a work device than a notification received on a personal device. For example, a notification "A" received on users work device stating, "Please call me soon" can receive a higher score than notification "B" received on user's personal device also stating, "Please call me soon." In another example, re-notification program 101 can assign a higher score for a notification received via an email application than a notification received via a social media application. In another example, re-notification program 101 can assign a score for a notification dependent on the sender of the notification. For example, re-notification program 101 can assign a higher score for a notification received from the user's boss than a notification received from the users friend.

In an embodiment, re-notification program 101 re-notifies a user of an unanswered notification at a predetermined amount of time from the original notification. For example, if a notification is received at 1:00 pm and opened at 2:00 pm, re-notification program 101 will re-notify the user of the unanswered notification after 3 hours has passed from the time the message was received (4:00 pm). In an embodiment, re-notification program 101 re-notifies a user of an unanswered notification at a predetermined amount of time from the time the user opened the original notification. For example, if a notification is received at 1:00 pm and the user opens the notification at 2:00 pm, re-notification program 101 will re-notify the user of the unanswered notification 3 hours after opening the notification (5:00 pm).

In an embodiment, re-notification program 101 re-notifies a user of an unanswered notification at a predetermined time or preference as indicated by the user. For example, a user indicates a predetermined amount of time as 1 hour from opening and not answering a notification as a preference. In this example, if a notification is received at 1:00 pm and user opens the notification at 1:05 pm, re-notification program 101 will re-notify the user about the notification if it remains unanswered at 2:05 pm.

In an embodiment, re-notification program 101 generates and transmits a re-notification for each prior notification having a score above a predetermined threshold. For example, if the predetermined threshold score is 7, re-notification program will re-notify the user of any notification with a score of 7 or higher. In an embodiment, re-notification program 101 generates and transmits a general summary of those prior notifications having a re-notification score above a predetermined threshold. For example, if the predetermined threshold score is 7, any notification with a score of 7 or higher will be summarized and displayed to the user. In an embodiment, re-notification program 101 summarizes a notification based on the subject line or a predetermined number of words starting at the beginning of the notification message. In this example, any notification with a score of 7 or higher will be summarized for the user with the first 10 words of the notification message. In this example, if there is a notification stating, "Hi Tom, how are you? Are you free this weekend to work on the boat? Let me know", re-notification program 101 will summarize the notification to the first 10 words of "Hi Tom, how are you? Are you free this weekend? . . . "

In another embodiment, re-notification program 101 determines the important parts of the message to summarize to the user. For example, if the user receives the notification "Hi Tom, how are you? Are you free this weekend to work on the boat? Let me know", re-notification program 101 summarizes the notification for the re-notification to state "Are you free this weekend to work on the boat?"

In an embodiment, re-notification program 101 transmits a re-notification via a pop-up window on a user device, such as user device 110A, 110B, and 110C, via user interface 112. In an embodiment, re-notification program 101 transmits a re-notification at a predetermined time. For example, user can indicate they want to receive re-notifications at 4:45 pm every day. In an embodiment, re-notification program 101 transmits a re-notification when the user is not busy. For example, re-notification program 101 waits until the user is not using any applications on any mobile device to re-notify the user of the unanswered notifications. In an embodiment, re-notification program 101 determines when the user is not busy by collaborating with the user's calendar. For example, if re-notification program 101 determines the users calendar indicates that today from 3-4 pm the user has a doctor's appointment, re-notification program 101 will determine the user is busy from 3-4 pm today and will not re-notify the user from 3-4 pm today.

Figure 2:
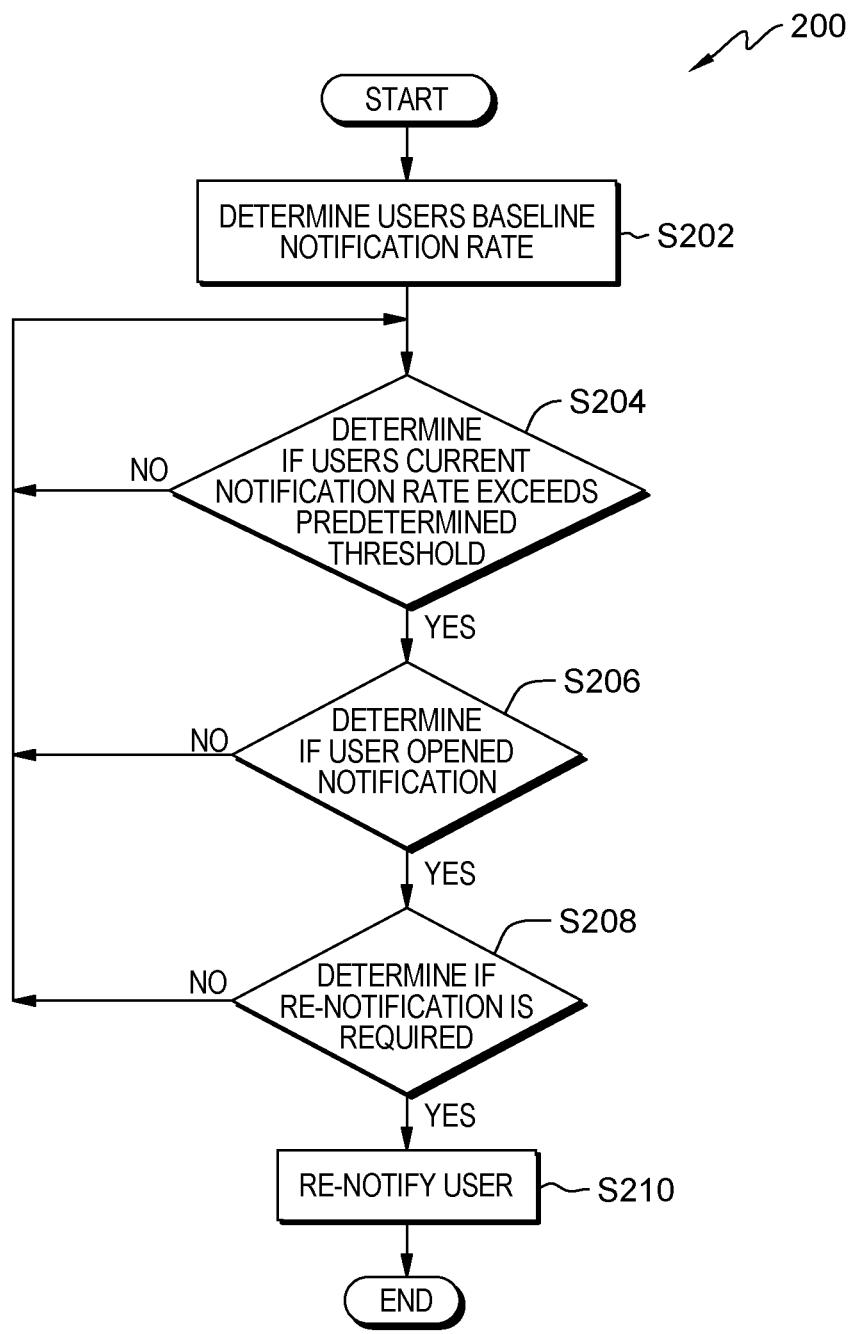
FIG. 2 is a flow chart diagram depicting operational steps for re-notifying a user of previously received notifications in accordance with at least one embodiment of the present invention.

FIG. 2 is a flow chart diagram, generally designated 200, depicting operational steps for re-notifying a user of an opened and unanswered notification in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, re-notification program 101 determines the user's baseline notification rate. In an embodiment, re-notification program 101 determines the user's baseline notification rate is the user's average notification rate. In an embodiment, re-notification program 101 determines a threshold based on the user's baseline notification rate. In an embodiment, notification program 101 determines the threshold to be one standard deviation greater than the baseline notification rate At decision step S204, re-notification program 101 determines if the user's current notification rate exceeds the predetermined threshold. In an embodiment, re-notification program 101 assigns a score to each notification. In an embodiment, re-notification program 101 determines the score of the notification based on the context of the notification, application of the notification, or device the notification was received on. If it is determined that the user's current notification rate does not exceed the predetermined threshold (decision step S204 "NO" branch), re-notification program 101 returns to step S204. If it is determined that the user's current notification rate exceeds the predetermined threshold (decision step S204 "YES" branch), re-notification program 101 proceeds to step S206.

At decision step S206, re-notification program 101 determines if the user opened the notification. If it is determined that the user did not open the notification (decision step S206 "NO" branch), re-notification program 101 proceeds to step S204. If it is determined that the user opened the notification (decision step S206 "YES" branch), re-notification program 101 proceeds to step S208.

At decision step S208, re-notification program 101 determines if re-notification is required. In an embodiment, re-notification program 101 determines re-notification is required if the user does not answer the notification. In an embodiment, re-notification program 101 determines re-notification is required if the user does not complete a requested task in the notification. If it is determined that re-notification is not required (decision step S208 "NO" branch), re-notification program 101 proceeds to step S204. If it is determined that re-notification is required (decision step S208 "YES" branch), re-notification program 101 proceeds to step S210.

At step S210, re-notification program 101 re-notifies the user about a previous received notification.

Figure 3:
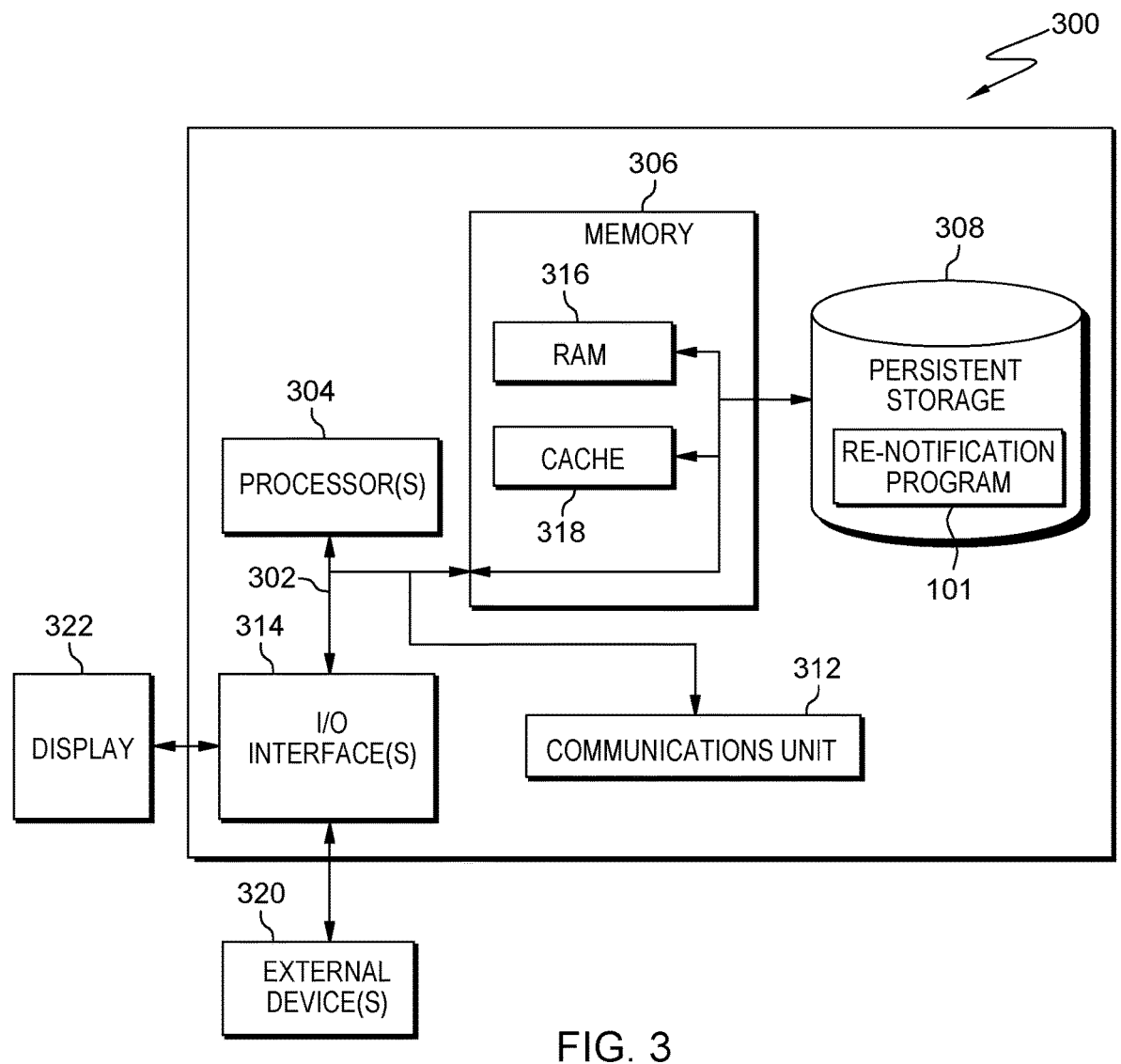
FIG. 3 is a block diagram depicting components of a computer, generally designated 300, suitable for executing re-notification program 101 in accordance with at least one embodiment of the present invention.

FIG. 3 is a block diagram depicting components of a computing device, generally designated 300, suitable for re-notification program 101 in accordance with at least one embodiment of the invention. Computing device 300 includes one or more processor(s) 304 (including one or more computer processors), communications fabric 302, memory 306 including, RAM 316 and cache 318, persistent storage 308, which further includes re-notification program 101, communications unit 312, I/O interface(s) 314, display 322, and external device(s) 320. It should be appreciated that FIG. 3 provides only an illustration of one embodiment and does not imply any limitations with regard to the environments in which different embodiments may be implemented. Many modifications to the depicted environment may be made.

As depicted, computing device 300 operates over communications fabric 302, which provides communications between computer processor(s) 304, memory 306, persistent storage 308, communications unit 312, and input/output (I/O) interface(s) 314. Communications fabric 302 can be implemented with any architecture suitable for passing data or control information between processor(s) 304 (e.g., microprocessors, communications processors, and network processors), memory 306, external device(s) 320, and any other hardware components within a system. For example, communications fabric 302 can be implemented with one or more buses.

Memory 306 and persistent storage 308 are computer readable storage media. In the depicted embodiment, memory 306 includes random-access memory (RAM) 316 and cache 318. In general, memory 306 can include any suitable volatile or non-volatile one or more computer readable storage media.

Program instructions for re-notification program 101 can be stored in persistent storage 308, or more generally, any computer readable storage media, for execution by one or more of the respective computer processor(s) 304 via one or more memories of memory 306. Persistent storage 308 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 can include one or more network interface cards. Communications unit 312 may provide communications through the use of either or both physical and wireless communications links. In the context of some embodiments of the present invention, the source of the various input data may be physically remote to computing device 300 such that the input data may be received, and the output similarly transmitted via communications unit 312.

I/O interface(s) 314 allows for input and output of data with other devices that may operate in conjunction with computing device 300. For example, I/O interface(s) 314 may provide a connection to external device(s) 320, which may be as a keyboard, keypad, a touch screen, or other suitable input devices. External device(s) 320 can also include portable computer readable storage media, for example thumb drives, portable optical or magnetic disks, and memory cards. Software and data used to practice embodiments of the present invention can be stored on such portable computer readable storage media and may be loaded onto persistent storage 308 via I/O interface(s) 314. I/O interface(s) 314 also can similarly connect to display 322. Display 322 provides a mechanism to display data to a user and may be, for example, a computer monitor.

What is claimed is:

1. A computer-implemented method for re-notifying a user about a previous notification, comprising:
   determining a baseline notification rate of the user, wherein the baseline notification rate of the user is based, at least in part, on an average number of notifications received within a predetermined time period on one or more user devices associated with the user;

determining whether the user's current notification rate exceeds a predetermined threshold with respect to the baseline notification rate;

determining, in response to the user's current notification rate exceeding the predetermined threshold, whether renotification of a notification is required; and re-notifying, in response to determining that renotification of the notification is required, the user about the notification.

2. The computer-implemented method of claim 1, wherein determining the baseline notification rate further includes determining a respective baseline notification rate for each user device associated with the user.

3. The computer-implemented method of claim 1, wherein determining the baseline notification rate further includes determining a baseline notification rate for any notifications received across all user devices associated with the user.

4. The computer-implemented method of claim 1, wherein renotification is required if an overall score associated with a notification is above a predetermined threshold.

5. The computer-implemented method of claim 4, wherein the overall score associated with the notification is incremented if the user opened a message associated with the notification, but did not respond to the message.

6. The computer-implemented method of claim 4, wherein the overall score associated with the notification is incremented based, at least in part, on:

determining that a level of urgency of a message associated with the notification is above a predetermined threshold; and determining that the user failed to respond to the message associated with the notification within a predetermined period of time.

7. The computer-implemented method of claim 4, wherein the overall score associated with the notification is incremented based on:

determining that the user's activity level at a time the notification is received is above a predetermined threshold.

8. The computer-implemented method of claim 4, wherein the overall score associated with the notification is incremented based, at least in part, on:

comparing an amount of time the user viewed a message associated with the notification to a number of words included in the message; and determining that a ratio of the amount of time the user viewed a message associated with the notification to the number of words included in the message is less than a predetermined threshold ratio.

9. A computer program product for re-notifying a user about a previous notification, the computer program product comprising one or more computer readable storage media and program instructions stored on the one or more computer readable storage media, the program instructions including instructions to:

determine a baseline notification rate of the user, wherein the baseline notification rate of the user is based, at least in part, on an average number of notifications received within a predetermined time period on one or more user devices associated with the user;

determine whether the user's current notification rate exceeds a predetermined threshold with respect to the baseline notification rate;

determine, in response to the user's current notification rate exceeding the predetermined threshold, whether renotification of a notification is required; and re-notify, in response to determining that renotification of the notification is required, the user about the notification.

10. The computer program product of claim 9, wherein the instructions to determine the baseline notification rate further includes instructions to determine a respective baseline notification rate for each user device associated with the user.

11. The computer program product of claim 9, wherein the instructions to determine the baseline notification rate further includes instructions to determine a baseline notification rate for any notifications received across all user devices associated with the user.

12. The computer program product of claim 9, wherein the instructions to determine if renotification is required further include instructions to determine that an overall score associated with a notification is above a predetermined threshold.

13. The computer program product of claim 12, wherein the overall score associated with the notification is incremented if the user opened a message associated with the notification, but did not respond to the message.

14. The computer program product of claim 12, wherein the overall score associated with the notification is incremented based, at least in part, on instructions to:

determine that a level of urgency of a message associated with the notification is above a predetermined threshold; and determine that the user failed to respond to the message associated with the notification within a predetermined period of time.

15. The computer program product of claim 12, wherein the instructions to determine the overall score associated with the notification is incremented based on instructions to:

determine that the user's activity level at a time the notification is received is above a predetermined threshold.

16. The computer program product of claim 12, wherein the instructions to determine the overall score associated with the notification is incremented based, at least in part, on instructions to:

compare an amount of time the user viewed a message associated with the notification to a number of words included in the message; and determine that a ratio of the amount of time the user viewed a message associated with the notification to the number of words included in the message is less than a predetermined threshold ratio.

17. A computer system for re-notifying a user about a previous notification, comprising:

one or more computer processors;

one or more computer readable storage media; and computer program instructions, the computer program instructions being stored on the one or more computer readable storage media for execution by the one or more computer processors, the computer program instructions including instructions to:

determine a baseline notification rate of the user, wherein the baseline notification rate of the user is based, at least in part, on an average number of notifications received within a predetermined time period on one or more user devices associated with the user;

determine whether the user's current notification rate exceeds a predetermined threshold with respect to the baseline notification rate;

determine, in response to the user's current notification rate exceeding the predetermined threshold, whether renotification of a notification is required; and re-notify, in response to determining that renotification of the notification is required, the user about the notification.

18. The computer system of claim 17, wherein the instructions to determine the baseline notification rate further includes instructions to determine a respective baseline notification rate for each user device associated with the user.

19. The computer system of claim 17, wherein the instructions to determine the baseline notification rate further includes instructions to determine a baseline notification rate for any notifications received across all user devices associated with the user.

20. The computer system of claim 17, wherein the instructions to determine if renotification is required further include instructions to determine that an overall score associated with a notification is above a predetermined threshold.

* * * * *